W. KENNEDY.
SHAFT COUPLING.
No. 92,319.    Patented July 6, 1869.
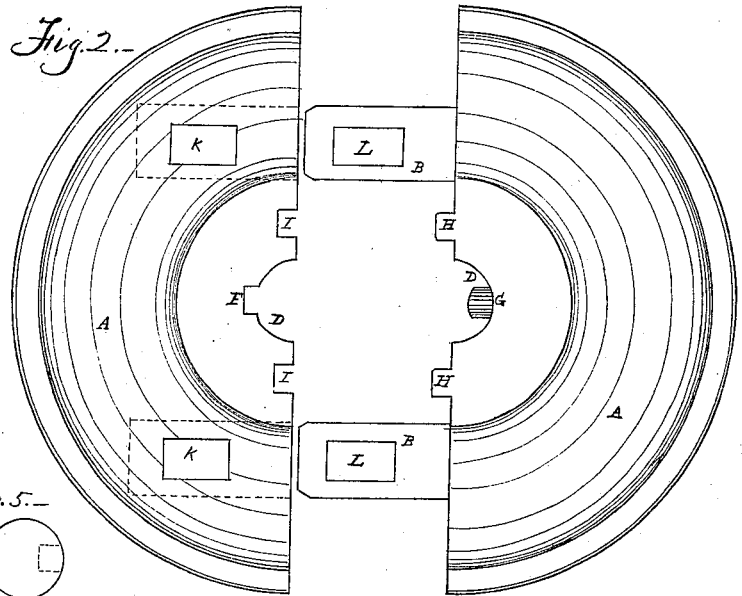
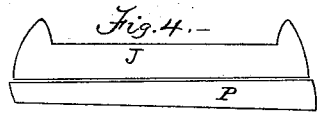
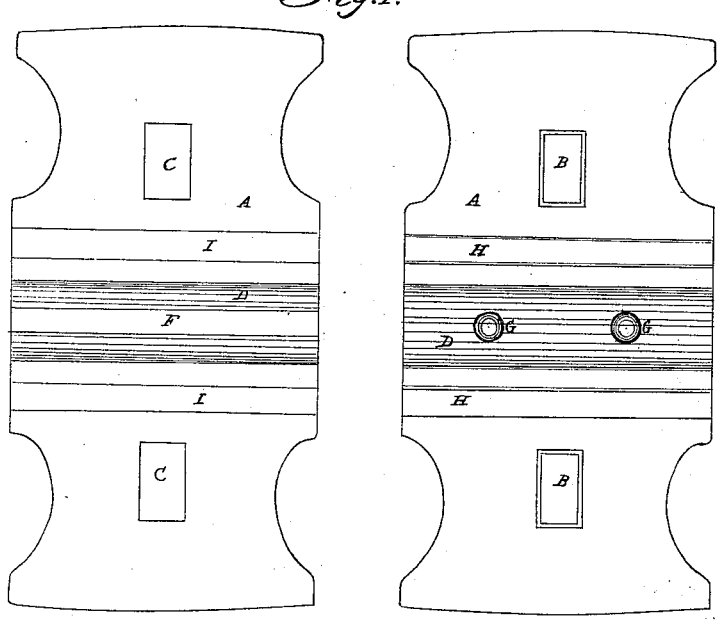

United States Patent Office.

WILLIAM KENNEDY, OF NEW LONDON, PENNSYLVANIA.

Letters Patent No. 92,319, dated July 6, 1869.

SHAFT-COUPLING.

The Schedule referred to in these Letters Patent and making part of the same.

*To all whom it may concern:*

Be it known that I, WILLIAM KENNEDY, of New London, Chester county, in the State of Pennsylvania, have invented an Improved Shaft-Coupling; and I hereby declare the following to be a full and exact description thereof, reference being had to the accompanying drawings, forming part of this specification.

The nature or essence of my invention consists in so constructing and arranging the parts of a shaft-coupling that it shall consist of a block, cylindrical or of other convenient form, having a bore through it to receive the ends of two shafts, and divided into two halves or parts, so that the plane of division shall pass through the axis of the bore, one or both of these parts being provided with tongues, to project into corresponding mortises in the opposite part, where they are secured by gibs and keys; there being also, on one side of the bore, short pins, to fit into one or more corresponding holes in each shaft, and on the other, a longitudinal groove, to receive a corresponding projection on the shafts.

In the following description of my improved coupling, I shall refer to the drawings hereinbefore mentioned—

Figure 1 being a view of the interior faces of the two parts of the same;

Figure 2, a side view of the two parts, as arranged for closing upon the shafts;

Figure 3, the ends of two shafts, ready for coupling;

Figure 4, a gib and key; and

Figure 5, an end view of a shaft.

In these drawings—

A A are the two halves of a cylindrical coupling, one of them being provided with tongues, B B, and the other with corresponding mortises, C C.

The ends of two shafts being placed together, as shown in fig. 3, the two parts of the coupling are closed, or brought together upon them, the tongues B entering the mortises C, the semi-cylindrical recesses D D forming the bore to hold the shafts, their projections E E fitting into the groove F on one side of the bore, and the pins G G, on the other side, fitting into corresponding holes in the shafts, shown in dotted lines in fig. 3.

The groove and projections, of course, prevent the shafts from turning in the coupling, while the pins prevent their working lengthwise.

The projections H, on one part of the coupling, are adapted to fit into the grooves I, in order to secure greater firmness and strength.

When the parts of the coupling are brought together, a gib, J, is put through each of the mortises K, it passing also through the mortises L in the tongues B, and these gibs are then secured, and the parts drawn firmly together upon the shafts by the key or wedge P.

It is obvious that the above-described coupling may also be used as a pulley for a band.

I claim a shaft-coupling, formed of two parts or halves, drawn together upon the shafts by means of tongues and mortises, secured by gibs and keys passing through the parts, substantially as set forth.

WILLIAM KENNEDY.

Witnesses:
JOSEPH K. PRITNER,
WM. SMILEY.